United States Patent [19]

Bonjouklian et al.

[11] Patent Number: 5,110,800
[45] Date of Patent: May 5, 1992

[54] DERIVATIVES OF ERYTHROMYCYLAMINE

[75] Inventors: Rosanne Bonjouklian, Zionsville; Manuel Debono; Herbert A. Kirst, both of Indianapolis; Julie A. Wind, Greenwood, all of Ind.

[73] Assignee: Eli Lilly and Company, Indianapolis, Ind.

[21] Appl. No.: 395,855

[22] Filed: Aug. 18, 1989

Related U.S. Application Data

[63] Continuation of Ser. No. 7,832, Jan. 28, 1987, abandoned, which is a continuation-in-part of Ser. No. 829,911, Feb. 3, 1986, abandoned.

[51] Int. Cl.$^5$ .................. A61K 31/70; C07H 17/08
[52] U.S. Cl. ........................... 514/29; 536/7.2; 536/7.4
[58] Field of Search ............. 536/7.2, 7.4; 514/29

[56] References Cited

U.S. PATENT DOCUMENTS

| | | | |
|---|---|---|---|
| 3,652,537 | 3/1972 | Massey et al. | 260/210 E |
| 3,660,376 | 5/1972 | Massey | 260/210 E |
| 3,681,322 | 8/1972 | Kitchell et al. | 260/210 E |
| 3,772,270 | 11/1973 | Gerzon et al. | 260/210 E |
| 3,780,019 | 12/1973 | Wildsmith | 260/210 E |
| 3,780,020 | 12/1973 | Evans | 260/210 E |
| 3,790,559 | 2/1974 | Wildsmith | 260/210 E |
| 3,794,635 | 2/1974 | Evans | 260/210 E |
| 4,016,263 | 4/1977 | Wetzel et al. | 424/180 |
| 4,048,306 | 9/1977 | Maier et al. | 424/180 |
| 4,256,738 | 3/1981 | Woitun et al. | 424/180 |

OTHER PUBLICATIONS

Massey et al. "Erythromycylamine", *Tetrahedron Letters* 1970 (2), 157–160.
Ryden et al., "N-Substituted Derivatives of Erythromycylamine," *J. Med. Chem.* 16 (9), 1059–1060 (1973).
Cockerill et al., "Substituent Effects on the pKa Values and Rates of Hydrolysis of Aryl-methylene-erythromycylamines," *J. Chem. Soc. Perkin, II* 1973, 173–179.
Massey et al., "Antibacterial Activity of 9(S)-erythromycylamine-Aldehyde Condensation Products," *J. Med. Chem.* 17, 105–107 (1974).
Vince et al., "Binding of N-Substituted Erythromycylamine to Ribosomes," *Antimicrobial Agents and Chemotherapy* 9 (1), 131–136 (1976).

*Primary Examiner*—Johnnie R. Brown
*Assistant Examiner*—Elli Peselev
*Attorney, Agent, or Firm*—Nancy J. Harrison; Leroy Whitaker

[57] ABSTRACT

Three new groups of 9-N-substituted derivatives of erythromycylamine with superior oral activity against Gram-positive pathogens, new processes for preparing derivatives of erythromycylamine and aliphatic aldehydes by controlling the pH of the reaction and by catalytic hydrogenation, and pharmaceutical compositions and methods using the new compounds are provided.

22 Claims, No Drawings

DERIVATIVES OF ERYTHROMYCYLAMINE

CROSS-REFERENCE TO RELATED APPLICATION

This application is a continuation of application Ser. No. 07/007,832, filed Jan. 28, 1987, now abandoned, which in turn is a continuation-in-part of application Ser. No. 06/824,911, filed Feb. 3, 1986, now abandoned.

SUMMARY OF THE INVENTION

This invention relates to three new groups of 9-N-substituted derivatives of erythromycylamine. The new derivatives are orally active against Gram-positive microorganisms and are, therefore, quite useful for treating infections caused by these organisms. The activity of the new derivatives is much superior to that of erythromycylamine and in many cases is comparable or superior to that of erythromycin. Some of the new derivatives are useful intermediates to other active compounds.

This invention also provides new processes for preparing derivatives of erythromycylamine and aliphatic aldehydes. One of the new processes involves controlling the pH during the reduction step, and the other involves catalytic hydrogenation, preferably at higher temperatures.

In other aspects, this invention relates to novel compositions comprising the new erythromycylamine derivatives and to methods for treating infections caused by Gram-positive bacteria using these compositions.

DETAILED DESCRIPTION

Three new groups of 9-N-substituted derivatives of erythromycylamine are provided by this invention. The first group of derivatives have the structure shown in formula 1.

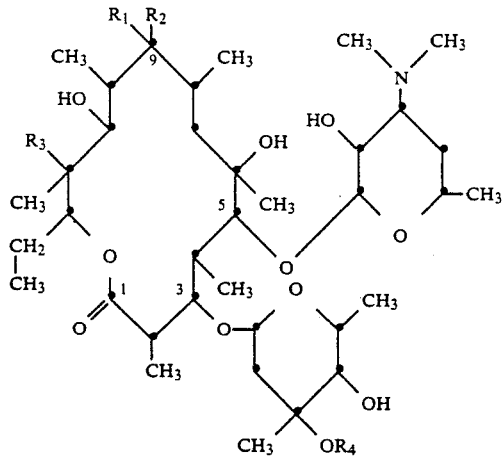

wherein $R_1$ and $R_2$ are different and are hydrogen or —NHCH$_2$R$_5$;

$R_3$ is hydrogen or hydroxyl;

$R_4$ is hydrogen or methyl; and $R_5$ is hydrogen or a $C_1$–$C_{14}$-alkyl or —(CH$_2$)$_l$X(CH$_2$)$_m$Y group, either of which group may have from one to three substituents selected from halo, hydroxyl, $C_1$–$C_4$-alkyl, $C_1$–$C_4$-alkoxy, $C_1$–$C_4$-alkylthio, cyano, $C_1$–$C_4$-alkoxycarbonyl, mono- or di($C_1$–$C_4$-alkyl)amino, —N(CH$_2$)$_s$, $R_6$-substituted-phenyl, or an $R_6$-substituted-monocyclic heterocyclic group having from 3 to 7 ring atoms;

X is oxygen or sulfur;

Y is —X(CH$_2$)$_n$CH$_3$, —N(CH$_2$)$_s$ or —N[(CH$_2$)$_n$CH$_3$]$_2$;

$l$ is 1 or 2;

m is an integer from 1 to 3;

n is an integer from 0 to 3;

s is an integer from 2 to 7; and $R_6$ is hydrogen, halo, $C_1$–$C_4$-alkyl or $C_1$–$C_4$-alkoxy; provided that, when the substituent on the $R_5$ group is selected from hydroxyl, cyano, alkoxycarbonyl, mono- or dialkylamino or —N(CH$_2$)$_s$, it cannot be located on the second or third carbon atom from the nitrogen of the —NHCH$_2$R$_5$ group unless the second carbon atom is quaternary; and the salts of these compounds.

The second group of derivatives of this invention are (9-N-alkyl-erythromycylamine)-formaldehyde adducts which have the structure shown in formula 2:

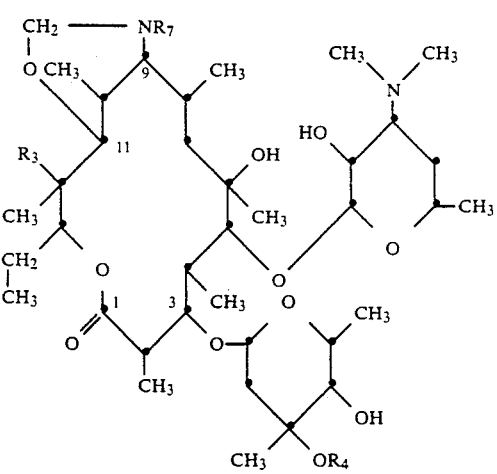

wherein $R_3$ and $R_4$ are as defined supra;

$R_7$ is CH$_2$R$_5$ as defined supra, $C_3$–$C_8$-cycloalkyl, —CHR$_8$(CH$_2$)$_p$R$_9$, —(CH$_2$)$_q$R$_{10}$ or —CH$_2$(CH=CH)$_r$Ar;

$R_8$ is $C_1$–$C_4$-alkyl, phenyl or benzyl;

$R_9$ is hydrogen, halo, hydroxy, $C_1$–$C_4$-alkoxy, mono- or di($C_1$–$C_4$-alkyl)amino, —N(CH$_2$)$_s$ or phenyl $R_{10}$ is hydroxy, cyano, $C_1$–$C_4$-alkoxycarbonyl, mono- or di($C_1$–$C_4$-alkyl)amino or —N(CH$_2$)$_s$;

Ar is phenyl; phenyl having one or more halo, $C_1$–$C_4$-alkyl, $C_1$–$C_4$-alkoxy or hydroxy substituents; or an $R_6$-substituted monocyclic aromatic heterocyclic group having from 5 to 7 ring atoms;

p is an integer from 1 to 5;

q is 2 or 3;

r is 0 or 1; and s is as defined supra;

and the salts of these compounds.

The third group of erythromycylamine compounds of this invention have formula 3:

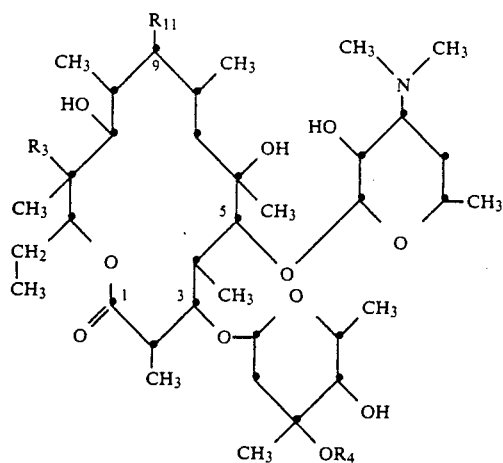

wherein $R_{11}$ is $-N(CH_3)R_7$ or $-N(CH_2)_s$; and $R_3$, $R_4$, $R_7$ and s are as defined supra; and the salts of these compounds.

Although no stereochemical assignments are indicated in the structures given herein, the stereochemistry is identical to that of the antiobiotics from which the compounds are prepared, e.g., erythromycins A, B, C and D. In formula 1, the $R_2$-substituent is on the same side of the ring as the 6-, 11- and 12-hydroxyl groups. In formulas 2 and 3, the stereochemistry of the 9-amino group is that of erythromycylamine, i.e., the 9-amino group and the 11-hydroxyl group are on the same side of the lactone ring.

As used herein, the term "alkyl" includes straight, branched and cyclic hydrocarbon moieties and combinations thereof containing the specified number of carbon atoms. Such groups can be saturated or unsaturated. When unsaturated, the alkyl group may contain from 1 to 3 double and/or triple bonds. The double bonds can be in either the cis or trans configuration.

The term "halo" means chloro, bromo, iodo or fluoro.

The term "monocyclic heterocyclic group containing from 3 to 7 ring atoms" refers to a heterocyclic ring which may be saturated or unsaturated and which contains at least 2 carbon atoms. In these groups, the heteroatom or atoms are selected from nitrogen, oxygen and sulfur. A "monocyclic aromatic heterocyclic group" refers to a heterocyclic ring which is unsaturated and aromatic in nature, but is otherwise as defined supra.

Typical monocyclic aromatic heterocyclic groups are pyridinyl, pyrimidinyl, pyridazinyl, pyrazinyl, imidazolyl, pyrazolyl, pyrrolyl, furanyl, oxazolyl, thiazolyl, thienyl and the like. Typical monocyclic saturated heterocyclic groups are piperidinyl, pyrrolidinyl, tetrahydrofuranyl, tetrahydropyranyl, morpholinyl, thiomorpholinyl, N-methylpiperazinyl and the like.

As used herein "a quaternary carbon atom" is a fully substituted carbon atom, that is, a carbon atom which has no hydrogen atoms bonded to it.

The new derivatives of this invention are prepared from the erythromycin antibiotics, which have the structures shown in formulas 4a-4d:

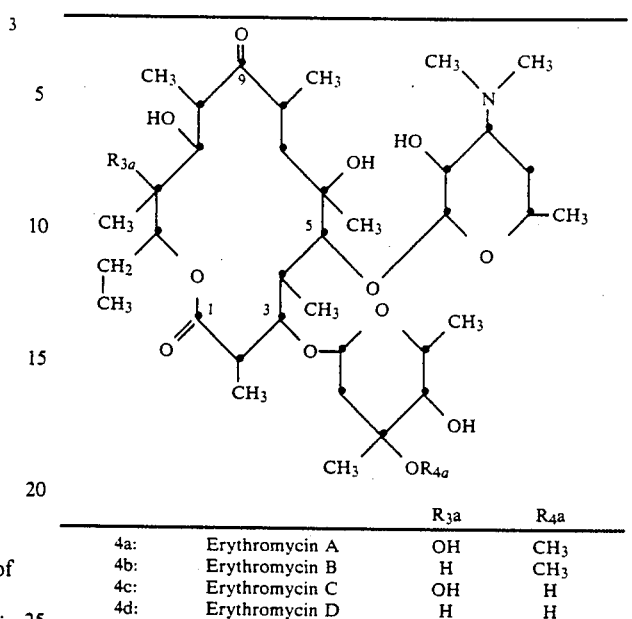

| | | $R_{3a}$ | $R_{4a}$ |
|---|---|---|---|
| 4a: | Erythromycin A | OH | $CH_3$ |
| 4b: | Erythromycin B | H | $CH_3$ |
| 4c: | Erythromycin C | OH | H |
| 4d: | Erythromycin D | H | H |

Erythromycin A, also known as erythromycin (see U.S. Pat. No. 2,653,899), is a successful commercial antibiotic. Erythromycins B, C and D are minor components of the erythromycin fermentation (see U.S. Pat. Nos. 2,834,714 and 4,496,546).

The erythromycylamines are prepared from erythromycins A-D [see, for example, Massey and Kitchell, U.S. Pat. No. 3,652,537; and Wildsmith, U.S. Pat. Nos. 3,790,559 and 3,780,019]. The erythromycylamines are shown in formulas 5a through 5h:

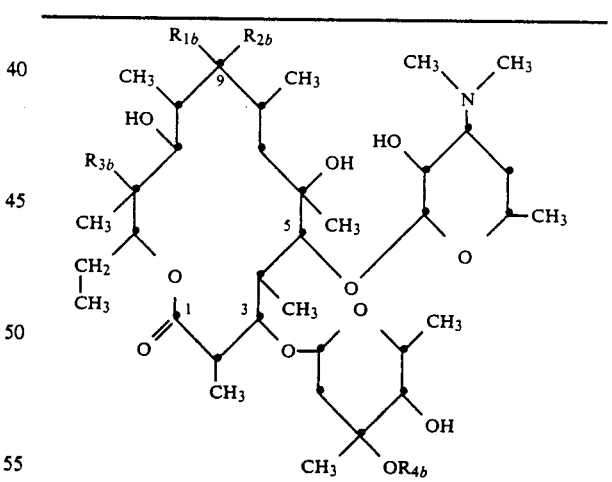

| | | $R_{1b}$ | $R_{2b}$ | $R_{3b}$ | $R_{4b}$ |
|---|---|---|---|---|---|
| 5a | Erythromycylamine A | H | $NH_2$ | OH | $CH_3$ |
| 5b | epi-Erythromycylamine A | $NH_2$ | H | OH | $CH_3$ |
| 5c | Erythromycylamine B | H | $NH_2$ | H | $CH_3$ |
| 5d | epi-Erythromycylamine B | $NH_2$ | H | H | $CH_3$ |
| 5e | Erythromycylamine C | H | $NH_2$ | OH | H |
| 5f | epi-Erythromycylamine C | $NH_2$ | H | OH | H |
| 5g | Erythromycylamine D | H | $NH_2$ | H | H |
| 5h | epi-Erythromycylamine D | $NH_2$ | H | H | H |

Prior to this invention, it was known that erythromycylamine could be condensed with ketones and aromatic aldehydes to produce the corresponding Schiff's bases. These Schiff's bases could then be reduced by standard methods, using a standard reducing agent such as sodium cyanoborohydride, sodium borohydride or hydrogenation, to give the corresponding N-alkyl derivatives (see, for example, U.S. Pat. No. 3,794,635). When erythromycylamine was condensed with aliphatic aldehydes, however, the corresponding Schiff's bases were not obtained. Instead, an oxazine was formed (see, for example, Kitchell and Gerzon, U.S. Pat. No. 3,681,322). Kitchell and Gerzon believed that the oxazine involved the hydroxyl group at C-6, but suggested that it could alternately involve the C-11 or C-12 hydroxyl group (see U.S. Pat. No. 3,681,322 at column 2). Later, evidence led to the conclusion that the Kitchell and Gerzon compounds involve the C-11 hydroxyl group as shown in formula 6:

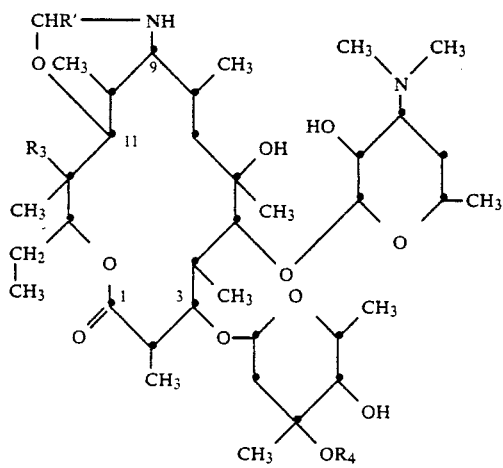

After Kitchell and Gerzon's work, Maier and others found that an even wider range of aliphatic aldehydes did not form Schiff's bases, but instead formed oxazine derivatives (see U.S. Pat. No. 4,048,306). It is critical to note that the oxazine derivatives were inert to standard reducing agents under the general conditions used by all these workers. Thus, although alkyl derivatives derived from erythromycylamine and ketones or aromatic aldehydes were known, alkyl derivatives derived from erythromycylamine and aliphatic aldehydes were not obtainable by previously known methodology.

Wetzel et al. (U.S. Pat. No. 4,016,263) and Woitun et. al. (U.S. Pat. No. 4,256,738) attempted to circumvent the aliphatic aldehyde problem and found a limited number of compounds which could be prepared by condensing erythromycylamine with a nitro-olefin or glyoxal derivative and then modifying the functional group at the distant end of the chain. Using this approach, however, required that the derivatives contain either two or three carbon atoms between the amino group and the functional group at the end of the carbon chain. Thus, this work did not accomplish a general solution applicable to all aliphatic aldehydes.

Our invention now provides a general solution to the preparation of alkyl derivatives of erythromycylamine and aliphatic aldehydes. The key to this solution involves controlling the pH of the reaction, using either a pre-formed oxazine derivative which has been independently isolated or a reaction in which an oxazine may or may not be pre-formed in situ but is not separated. Thus, when either a pre-formed oxazine or an erythromycylamine-aldehyde mixture is maintained at a pH in the range of from about 4 to about 6 in the presence of reducing agents such as sodium borohydride or sodium cyanoborohydride, the corresponding N-alkyl derivative can be readily obtained, using any aliphatic aldehyde.

Alternatively, we have also discovered that catalytic hydrogenation of the oxazine or of the erythromycylamine-aldehyde adduct can be used to accomplish the same chemical transformation. With these new procedures, a number of erythromycylamine derivatives which were previously unobtainable have now been prepared. The new group of derivatives made possible by these procedures is shown in formula 1.

In carrying out the first process of this invention, the key point is controlling the pH so that the intermediate Schiff's base between erythromycylamine and the aliphatic aldehyde is present to some degree. The Schiff's base can then be reduced by reducing agents to the corresponding alkyl derivative. The reaction conditions thus promote or establish the presence of some Schiff's base in the equilibrium between the oxazine, the Schiff's base and dissociated starting materials. The pH control is most conveniently performed in the presence of the reducing agent so that any Schiff's base which is formed can be rapidly reduced to the N-alkyl derivative. The equilibrium is thus constantly being displaced to give the desired product.

Controlling the pH is accomplished by standard methods, i.e., addition of acids, bases or buffer solutions to adjust the reaction mixture to the desired pH, using standard methodology such as a pH meter or pH indicator paper. Reaction progress can be followed by standard methods such as thin-layer chromatography (TLC) or high performance liquid chromatography (HPLC) until the reduction is complete. The product can be isolated by standard methods such as extraction, precipitation, crystallization, and/or chromatographic procedures.

The second process of this invention involves hydrogenation over standard catalysts, such as palladium, platinum and nickel. The catalyst is typically presented on a carrier such as charcoal. The hydrogenation is conveniently carried out in the presence of a solvent or mixture of solvents in which the reactants are soluble. Moderate pressure ranges, e.g. 1 to 50 atmospheres, are suitable for the reaction. The pressure used will vary, depending upon other factors such as the catalyst used. Although different temperatures may be used in the reaction, it has been found that the reductive alkylation is more selective when hydrogenation is performed at higher temperatures, e.g. from about 80° to about 150° C.

Furthermore, we have discovered that it is possible to react monoalkyl derivatives of erythromycylamine with formaldehyde to make the methylene bridged compounds of formula 2. These compounds represent the first examples of 9-N-disubstituted derivatives of erythromycylamine. Aldehydes other than formaldehyde react poorly, if at all, with monoalkyl derivatives of erythromycylamine.

We have further discovered that the bridged methylene compounds of formula 2 can be opened via reductive techniques, such as those described supra, to make tertiary amines, thus providing a method for obtaining the previously unknown tertiary amine derivatives of erythromycylamine shown in formula 3.

Finally, we have discovered that it is possible to cyclize erythromycylamine with dialdehydes to make cyclic tertiary amino derivatives, i.e., the formula 3 compounds wherein $R_{11}$ is $-N(CH_2)_5$.

The derivatives of this invention form salts, particularly acid addition salts. These acid addition salts are also useful as antibiotics and are a part of this invention. In another aspect, such salts are useful as intermediates, for example, for separating and purifying the derivatives. In addition, the salts have an improved solubility in water.

benzenesulfonic, sorbic, picric, benzoic, cinnamic, and like acids.

Pharmaceutically acceptable acid addition salts are an especially preferred group of salts of this invention. Pharmaceutically acceptable acid addition salts are those salts useful in the chemotherapy of a warm-blooded animal.

Typical formula 1 compounds are shown in Table I.

TABLE I
Illustrative Formula 1 Compounds

| Compound Number | $R_1$ | $R_2$ | $R_3$ | $R_4$ |
| --- | --- | --- | --- | --- |
| 1 | H | $-NHMe$ | OH | Me |
| 2 | H | $-NHEt$ | OH | Me |
| 3 | H | $-NHPr$ | OH | Me |
| 4 | H | $-NH(n-Bu)$ | OH | Me |
| 5 | H | $-NH(CH_2)_4Me$ | OH | Me |
| 6 | H | $-NH(CH_2)_5Me$ | OH | Me |
| 7 | H | $-NH(CH_2)_6Me$ | OH | Me |
| 8 | H | $-NH(CH_2)_7Me$ | OH | Me |
| 9 | H | $-NH(CH_2)_9Me$ | OH | Me |
| 10 | H | $-NH(CH_2)_{11}Me$ | OH | Me |
| 11 | H | $-NH(CH_2)_2CH(Me)_2$ | OH | Me |
| 12 | H | $-NHCH_2CH(Et)_2$ | OH | Me |
| 13 | H | $-NH(cis-dec-4-enyl)$ | OH | Me |
| 14 | H | $-NH(trans-dec-4-enyl)$ | OH | Me |
| 15 | H | $-NHCH_2(cyclohex-3-enyl)$ | OH | Me |
| 16 | H | $-NHCH_2(cyclooctyl)$ | OH | Me |
| 17 | H | $-NH(CH_2)_3Ph$ | OH | Me |
| 18 | H | $-NHCH_2C\equiv CPh$ | OH | Me |
| 19 | H | $-NHCH_2(endo-5-norbornen-2-yl)$ | OH | Me |
| 20 | H | $-NHCH_2(exo-5-norbornen-2-yl)$ | OH | Me |
| 21 | H | $-NH(CH_2)_5OH$ | OH | Me |
| 22 | H | $-NHCH_2C(Me)_2CH_2OH$ | OH | Me |
| 23 | H | $-NH(CH_2)_3OMe$ | OH | Me |
| 24 | H | $-NH(3,7-diMe-7-MeO-octyl)$ | OH | Me |
| 25 | H | $-NH(CH_2)_2O(CH_2)_2OMe$ | OH | Me |
| 26 | H | $-NH(CH_2)_3SMe$ | OH | Me |
| 27 | H | $-NHCH_2(2-COOEt-cycloprop-1-yl)$ | OH | Me |
| 28 | H | $-NH(undec-10-en-1-yl)$ | OH | Me |
| 29 | H | $-NH(CH_2)_3CN$ | OH | Me |
| 30 | H | $-NH(CH_2)_2(2,6,6-triMe-cyclohex-1-en-1-yl)$ | OH | Me |
| 31 | H | $-NH(CH_2)_2OCH_3$ | OH | Me |
| 32 | H | $-NH(CH_2)_2O(CH_2)_3OEt$ | OH | Me |
| 33 | H | $-NH(CH_2)_3O(CH_2)_2OMe$ | OH | Me |
| 34 | H | $-NH(CH_2)_2O(CH_2)_2NMe_2$ | OH | Me |
| 35 | H | $-NH(CH_2)_3O(CH_2)_2N(CH_2)_6$ | OH | Me |
| 36 | H | $-NH(CH_2)_2S(CH_2)_2OMe$ | OH | Me |
| 37 | H | $-NHEt$ | H | Me |
| 38 | H | $-NHPr$ | H | Me |
| 39 | H | $-NH(CH_2)_5Me$ | H | Me |
| 40 | H | $-NH(CH_2)_2CH(Me)_2$ | H | Me |
| 41 | H | $-NH(CH_2)_9CH_3$ | H | Me |
| 42 | H | $-NH(cis-dec-4-enyl)$ | H | Me |
| 43 | H | $-NHCH_2(cyclohex-3-enyl)$ | H | Me |
| 44 | H | $-NH(CH_2)_3Ph$ | H | Me |
| 45 | H | $-NHCH_2C\equiv CPh$ | H | Me |
| 46 | H | $-NHCH_2(pyridin-2-yl)$ | H | Me |
| 47 | H | $-NHCH_2(furan-2-yl)$ | H | Me |
| 48 | H | $-NHCH_2(thien-3-yl)$ | H | Me |
| 49 | H | $-NH(CH_2)_2O(CH_2)_2OMe$ | H | Me |
| 50 | H | $-NH(CH_2)_5(morpholin-4-yl)$ | H | Me |
| 51 | H | $-NHCH_2(cyclopropyl)$ | H | Me |
| 52 | H | $-NH(CH_2)_3OMe$ | H | Me |
| 53 | $-NHPr$ | H | OH | Me |
| 54 | $-NHPr$ | H | H | Me |
| 55 | H | $-NHPr$ | OH | H |
| 56 | H | $-NHPr$ | H | H |
| 57 | H | $-NH(CH_2)_2O(CH_2)_2OMe$ | OH | H |

Representative suitable salts include those salts formed by standard reactions with both organic and inorganic acids such as, for example, sulfuric, hydrochloric, phosphoric, acetic, succinic, citric, lactic, maleic, fumaric, palmitic, cholic, pamoic, mucic, D-glutamic, d-camphoric, glutaric, glycolic, phthalic, tartaric, formic, lauric, stearic, salicylic, methanesulfonic, Typical formula 2 compounds are shown in Table II.

TABLE II

Illustrative Formula 2 Compounds

| Compound Number | $R_3$ | $R_4$ | $R_7$ |
|---|---|---|---|
| 58 | OH | $CH_3$ | iPr |
| 59 | OH | $CH_3$ | Pr |
| 60 | OH | $CH_3$ | cyclopentyl |
| 61 | OH | $CH_3$ | cyclohexyl |
| 62 | OH | $CH_3$ | benzyl |
| 63 | OH | $CH_3$ | 5-dimethylamino-2-pentyl |
| 64 | H | $CH_3$ | Pr |
| 65 | H | $CH_3$ | cyclohexyl |
| 66 | H | $CH_3$ | —$(CH_2)_3$OMe |
| 67 | OH | H | cyclohexyl |
| 68 | H | H | Et |

Typical formula 3 compounds are shown in Table III.

TABLE III

Illustrative Formula 3 Compounds

| Compound Number | $R_3$ | $R_4$ | $R_{10}$ |
|---|---|---|---|
| 69 | OH | $CH_3$ | —N(Me)$_2$ |
| 70 | OH | $CH_3$ | —N(Me)(iPr) |
| 71 | OH | $CH_3$ | —N(cyclohexyl)(Me) |
| 72 | OH | $CH_3$ | —N(CH$_2$)$_5$ |
| 73 | OH | $CH_3$ | —N(CH$_2$)$_2$ |
| 74 | H | $CH_3$ | —N(Me)(cyclopropyl) |
| 75 | H | $CH_3$ | —N(CH$_2$)$_4$ |
| 76 | H | $CH_3$ | —N(Et)(Me) |
| 77 | OH | H | —N(Me)$_2$ |
| 78 | H | H | —N(Me)$_2$ |

The new derivatives of this invention inhibit the growth of a broad spectrum of pathogenic bacteria, especially Gram-positive bacteria and Gram-negative cocci such as *Haemophilus influenzae*. Tables IV and V summarize the minimal inhibitory concentrations (MIC's) at which these compounds inhibit certain organisms, as determined by standard agar-dilution assays.

TABLE IV

Antibiotic Activity of Formula 1 Derivatives[a]

| Organism | Compound Number[b] | | | | | | | | |
|---|---|---|---|---|---|---|---|---|---|
| | 1 | 2 | 3 | 4 | 5 | 6 | 7 | 8 | 9 |
| *Staphylococcus aureus* X1.1 | 1 | 1 | 1 | 0.25 | 0.5 | 1 | 0.25 | 0.5 | 1 |
| *Staphylococcus aureus* V41[c] | 64 | —[h] | — | — | — | — | — | 8 | 4 |
| *Staphylococcus aureus* X400[d] | 64 | — | — | — | — | — | — | 8 | 8 |
| *Staphylococcus aureus* S13E | 0.125 | 2 | 0.25 | 1 | 1 | 1 | NT | 0.25 | 0.5 |
| *Staphylococcus epidermidis* 270 | — | — | — | — | — | — | — | NT | NT |
| *Staphylococcus epidermidis* 222 | 0.25 | 1 | 0.5 | 0.25 | 0.5 | 0.25 | 0.25 | 0.25 | 1 |
| *Streptococcus pyogenes* C203 | 0.06 | 0.125 | 0.03 | 0.06 | 0.06 | 0.125 | 0.015 | 0.015 | 0.015 |
| *Streptococcus pneumoniae* Park I | NT[g] | 0.03 | 0.015 | 0.015 | 0.015 | >0.008 | 0.015 | 0.015 | 0.015 |
| *Streptococcus sp.* group D X66 | 0.125 | 0.25 | 0.125 | 0.125 | 0.125 | 0.125 | 0.06 | 0.06 | 0.25 |
| *Streptococcus sp.* group D 2041 | 1 | 4 | 4 | 1 | 2 | 4 | 2 | 1 | 2 |
| *Haemophilus influenzae* C.L.[e] | 0.5 | 1 | 1 | 1 | 1 | 4 | 1 | 1 | 2 |
| *Haemophilus influenzae* 76[f] | 1 | 4 | 2 | 1 | 2 | 4 | 2 | 1 | 1 |
| *Escherichia coli* EC14 | 32 | 32 | 32 | 64 | 128 | 64 | 64 | — | — |
| *Klebsiella pneumoniae* X68 | 64 | 64 | 128 | 128 | 128 | NT | — | — | — |

| Organism | Compound Number | | | | | | | | |
|---|---|---|---|---|---|---|---|---|---|
| | 10 | 11 | 12 | 13 | 14 | 15 | 16 | 17 | 18 |
| *Staphylococcus aureus* X1.1 | 4 | 1 | 0.5 | 0.25 | 0.5 | 1 | 0.5 | 1 | 1 |
| *Staphylococcus aureus* V41[c] | 8 | — | 16 | 8 | 8 | — | 64 | — | 16 |
| *Staphylococcus aureus* X400[d] | 8 | — | 16 | 8 | 16 | — | 64 | — | 32 |
| *Staphylococcus aureus* S13E | 2 | 0.5 | 0.25 | 0.25 | 0.25 | 1 | 0.06 | 0.5 | 0.5 |
| *Staphylococcus epidermidis* 270 | NT | — | — | 32 | 32 | — | — | — | 64 |
| *Staphylococcus epidermidis* 222 | 4 | 0.25 | 0.5 | 0.125 | 0.25 | 0.25 | 0.25 | 0.5 | 0.5 |
| *Streptococcus pyogenes* C203 | 0.5 | 0.06 | 0.015 | <0.008 | <0.008 | 0.06 | <0.008 | 0.015 | <0.008 |
| *Streptococcus pneumoniae* Park I | 0.06 | 0.03 | 0.015 | <0.008 | <0.008 | <0.008 | NT | 0.015 | <0.008 |
| *Streptococcus sp.* group D X66 | 1 | 0.125 | 0.125 | 0.06 | 0.125 | 0.25 | <0.008 | 0.06 | 0.25 |
| *Streptococcus sp.* group D 2041 | 8 | 1 | 8 | 1 | 2 | 8 | 1 | 2 | 1 |
| *Haemophilus influenzae* C.L.[e] | 8 | 1 | 2 | 2 | 2 | 4 | 1 | 2 | 4 |
| *Haemophilus influenzae* 76[f] | 4 | 1 | 2 | NT | NT | 2 | 1 | 2 | NT |
| *Escherichia coli* EC14 | — | 128 | 64 | 128 | 128 | 64 | 64 | 128 | — |
| *Klebsiella pneumoniae* X68 | — | 128 | 32 | — | — | NT | — | — | — |

| Organism | Compound Number | | | | | | | |
|---|---|---|---|---|---|---|---|---|
| | 19 | 20 | 21 | 22 | 23 | 24 | 25 | 26 |
| *Staphylococcus aureus* X1.1 | 2 | 2 | 0.5 | 1 | 2 | 0.5 | 1 | 0.5 |
| *Staphylococcus aureus* V41[c] | — | — | — | — | — | 64 | — | — |
| *Staphylococcus aureus* X400[d] | — | — | — | — | — | 64 | — | — |
| *Staphylococcus aureus* S13E | 2 | 2 | 0.25 | 1 | 2 | 0.25 | 8 | 0.25 |
| *Staphylococcus epidermidis* 270 | — | — | — | — | — | — | — | — |
| *Staphylococcus epidermidis* 222 | 1 | 1 | 0.5 | 1 | 0.5 | 0.25 | 1 | 0.5 |
| *Streptococcus pyogenes* C203 | 0.25 | 0.25 | <0.008 | 0.03 | 0.125 | 0.015 | 0.125 | 0.015 |
| *Streptococcus pneumoniae* Park I | 0.015 | 0.015 | <0.008 | 0.015 | 0.03 | NT | 0.015 | 0.015 |
| *Streptococcus sp.* group D X66 | 1 | 1 | 0.25 | 0.25 | 0.25 | 0.03 | 0.25 | 0.25 |
| *Streptococcus sp.* group D 2041 | 8 | 8 | 4 | 4 | 8 | 2 | 8 | 2 |
| *Haemophilus influenzae* C.L.[e] | 8 | 8 | 2 | 1 | 4 | 1 | 2 | 4 |
| *Haemophilus influenzae* 76[f] | 8 | 8 | NT | 0.25 | 4 | 2 | 4 | 4 |
| *Escherichia coli* EC14 | 64 | 64 | 32 | 32 | 64 | 128 | 64 | 128 |
| *Klebsiella pneumoniae* X68 | — | — | 128 | 64 | NT | — | 128 | — |

| Compound Number |
|---|

TABLE IV-continued

Antibiotic Activity of Formula 1 Derivatives[a]

| Organism | 27 | 28 | 29 | 30 | 31 | 38 | 41 | 49 |
|---|---|---|---|---|---|---|---|---|
| Staphylococcus aureus X1.1 | 1 | 2 | 1 | 1 | 0.5 | 0.5 | 2 | 1 |
| Staphylococcus aureus V41[c] | — | 8 | — | 16 | — | 8 | 4 | 128 |
| Staphylococcus aureus X400[d] | — | 8 | — | 32 | — | 64 | 4 | — |
| Staphylococcus aureus S13E | 1 | 2 | 128 | 2 | 0.5 | 1 | 1 | 0.5 |
| Staphylococcus epidermidis 270 | — | 32 | — | 64 | — | — | 8 | — |
| Staphylococcus epidermidis 222 | 0.5 | 1 | 1 | 1 | 0.25 | 0.5 | 0.5 | 1 |
| Streptococcus pyogenes C203 | 0.5 | 1 | 1 | 0.5 | 0.06 | 0.125 | 0.03 | 0.015 |
| Streptococcus pneumoniae Park I | NT | NT | NT | NT | 0.03 | 0.125 | 0.03 | 0.015 |
| Streptococcus sp. group D X66 | 0.125 | 0.125 | 0.125 | 0.125 | 0.125 | 0.125 | 0.5 | 0.25 |
| Streptococcus sp. group D 2041 | 2 | 2 | 4 | 2 | 8 | 2 | 4 | 4 |
| Haemophilus influenzae C.L.[e] | 2 | 2 | 2 | 4 | 0.5 | 2 | 8 | 4 |
| Haemophilus influenzae 76[f] | 2 | 2 | 4 | 4 | 2 | 4 | 4 | 8 |
| Escherichia coli EC14 | 128 | — | 64 | — | 16 | 64 | — | 128 |
| Klebsiella pneumoniae X68 | 128 | — | 128 | — | 32 | 128 | — | 128 |

[a] MIC's in mcg/mL
[b] Compound numbers from Table I
[c] Penicillin-resistant strain
[d] Methicillin-resistant strain
[e] Ampicillin-sensitive strain
[f] Ampicillin-resistant strain
[g] NT = not tested
[h] — = >128

TABLE V

Antibiotic Activity of Formula 2 and 3 Derivatives[a]

| Organism | 58 | 59 | 60 | 62 | 63 | 69 | 70 | 71 | 72 |
|---|---|---|---|---|---|---|---|---|---|
| Staphylococcus aureus X1.1 | 1 | 0.25 | 1 | 1 | 8 | 4 | 8 | 16 | 16 |
| Staphylococcus aureus V41[c] | —[h] | 8 | — | 64 | — | 64 | — | — | — |
| Staphylococcus aureus X400[d] | — | 8 | — | 128 | — | 64 | — | — | — |
| Staphylococcus aureus S13E | 1 | 0.125 | 2 | 1 | 8 | 2 | 8 | 16 | 16 |
| Staphylococcus epidermidis EPI1 | 128 | — | — | 64 | — | — | — | — | — |
| Staphylococcus epidermidis 222 | 0.5 | 0.125 | 1 | 0.5 | 8 | 2 | 8 | 8 | 8 |
| Streptococcus pyogenes C203 | 0.125 | <0.008 | 0.125 | 0.125 | 0.5 | 0.25 | 0.5 | 1 | 1 |
| Streptococcus pneumoniae Park I | 0.06 | <0.008 | 0.06 | 0.06 | 0.5 | NT[g] | 0.5 | 0.125 | 1 |
| Streptococcus sp. group D X66 | 0.25 | 0.125 | 0.5 | 0.5 | 2 | 0.5 | 2 | 8 | 4 |
| Streptococcus sp. group D 2041 | 4 | 1 | 8 | 4 | 32 | 4 | 32 | 128 | 128 |
| Haemophilus influenzae C.L.[e] | 4 | 1 | 4 | 4 | 8 | 2 | 32 | 32 | 2 |
| Haemophilus influenzae 76[f] | 4 | 2 | 4 | 4 | 8 | 8 | 32 | 32 | 64 |
| Escherichia coli EC14 | 32 | 32 | 64 | — | 32 | 128 | — | — | — |
| Klebsiella pneumoniae X68 | 64 | 128 | 64 | — | 128 | — | — | — | — |

[a] MIC's in mcg/mL
[b] Compound numbers from Table II-III
[c] Penicillin-resistant strain
[d] Methicillin-resistant strain
[e] Ampicillin-sensitive strain
[f] Ampicillin-resistant strain
[g] NT = not tested
[h] — = >128

In addition to excellent in vitro activity against erythromycin-sensitive bacteria, several members of this new series have shown in vitro activity against erythromycin-resistant strains. These include strains which are inducibly-resistant to erythromycin (S. aureus V41 and X400 and S. epidermidis EPI1) and even strains which are constitutively-resistant (S. epidermidis 270).

The new derivatives of this invention have also shown in vivo antimicrobial activity against experimental bacterial infections. When two doses of test compound were administered to mice in experimental infections, the activity observed was measured as an $ED_{50}$ value [effective dose in mg/kg to protect 50% of the test animals: see Warren Wick, et al., J. Bacteriol. 81, 233-235 (1961)]. $ED_{50}$ values observed for some of the derivatives are given in Tables VI and VII.

TABLE VI

Subcutaneous $ED_{50}$ Values for Erythromycylamine Derivatives against Experimental Infections Induced by Gram-positive Bacteria

| | Infecting Organism | | |
|---|---|---|---|
| Compound Numbers[a] | Staphylococcus aureus | Streptococcus pyogenes | Streptococcus pneumoniae |
| 3 | 6.11 | 1.67 | 1.77 |
| 23 | 3.73 | 2.1 | 8.3 |
| 31 | 2.50 | 2.1 | 3.3 |
| 58 | >10,4.5[b] | NT[c] | NT |
| 60 | 5.0 | NT | NT |

[a] Compound numbers from Tables I and II
[b] Results of two tests
[c] Not tested

TABLE VII

Oral $ED_{50}$ Values for Erythromycylamine Derivatives against Experimental Infections Induced by Gram-positive Bacteria

| | Infecting Organism | | |
|---|---|---|---|
| Compound Number[a] | Staphylococcus aureus | Streptococcus pyogenes | Streptococcus pneumoniae |
| 1 | 43.8 | 21.0 | 35.4 |

TABLE VII-continued

Oral ED$_{50}$ Values for Erythromycylamine Derivatives against Experimental Infections Induced by Gram-positive Bacteria

| Compound Number[a] | Infecting Organism | | |
|---|---|---|---|
| | Staphylococcus aureus | Streptococcus pyogenes | Streptococcus pneumoniae |
| 2 | 23.4 | 12.5 | 13.4 |
| 3 | 11.8,12.6[b] | 3.3,6.1 | 7.2,6.3 |
| 4 | 14.7 | 12.5 | 12.5 |
| 5 | 25 | 8.8 | 13.6 |
| 6 | 38.6 | 17.7 | 14.3 |
| 7 | >50 | 30.6 | 33.2 |
| 8 | >50,>50 | 23.4,38.3 | 46.1,>50 |
| 9 | >50 | >50 | >50 |
| 10 | >45 | >50 | >50 |
| 11 | 12.5 | 8.8 | 10.8 |
| 12 | 22.3 | 9.4 | 16.6 |
| 15 | 20.0 | 14.9 | 8.7 |
| 17 | 36.9 | 14.1 | 17.2 |
| 18 | >50 | 26.7 | 33.9 |
| 19 | >50 | 16.6 | 25.0 |
| 20 | >50 | 16.6 | 25.0 |
| 21 | >50 | 42.6 | >50 |
| 22 | >50 | 19.8 | 46.1 |
| 23 | 16.4 | 13.5 | 15.9 |
| 24 | >45.6 | 25.0 | 23.6 |
| 25 | 23.3 | 27.1 | 21.8 |
| 26 | 11.7,50 | 7.9 | 9.2 |
| 27 | 50 | 27.1 | 30.4 |
| 29 | 36.1 | 21.1 | 28.7 |
| 30 | >50 | >50 | >50 |
| 31 | 35.2 | 16.34 | 18.7 |
| 38 | 41.0 | 20.6 | 50 |
| 41 | >50 | >50 | >50 |
| 49 | >50 | 40.9 | >56 |
| 58 | 9.4,9.1,4.0[c] | 6.7 | 5.7 |
| 59 | 7.2 | 4.8 | 5.0 |
| 60 | >50,15.7,38.6 | 10.2 | 9.0 |
| 62 | >50,>50,46 | 15.6 | 15.2 |
| 69 | >43.8 | 21.9 | 43.5 |
| 71 | >50 | >50 | >50 |
| 72 | >44 | 23.6 | 20.6 |

[a]Compound Numbers from Tables I-III
[b]Results of two tests
[c]Results of three tests Pharmaceutical formulations of the compounds of formulas 1, 2 and 3 or their salts are also part of this invention. The compounds, preferably as a pharmaceutically acceptable salt, can be formulated for oral or parenteral administration for the therapeutic or prophylactic treatment of bacterial infections. For example, a compound of this invention can be admixed with conventional pharmaceutical carriers and excipients and used in the form of tablets, capsules, elixirs, suspensions, syrups, wafers and the like. The compositions comprising a compound of this invention will contain from about 0.1 to about 90% by weight of the active compound, and more generally from about 10 to about 30%. The compositions may contain common carriers and excipients, such as corn starch or gelatin, lactose, sucrose, microcrystalline cellulose, kaolin, mannitol, dicalcium phosphate, sodium chloride and alginic acid. Disintegrators commonly used in the formulations of this invention include croscarmellose sodium, microcrystalline cellulose, corn starch, sodium starch glycolate and alginic acid. Tablet binders that can be included are acacia, methylcellulose, sodium carboxymethylcellulose, polyvinylpyrrolidone (Povidone), hydroxypropyl methylcellulose, sucrose, starch and ethylcellulose. Lubricants that can be used include magnesium stearate or other metallic stearates, stearic acid, silicone fluid, talc, waxes, oils and colloidal silica. Flavoring agents such as peppermint, oil of wintergreen, cherry flavoring or the like can also be used. It may be desirable to add a coloring agent to make the dosage form more esthetic in appearance or to help identify the product.

For intravenous (IV) use, a water soluble form of the compound can be dissolved in one of the commonly used intravenous fluids and administered by infusion. Such fluids as, for example, physiological saline, Ringer's solution or 5% dextrose solution can be used.

For intramuscular preparations, a sterile formulation of a suitable soluble salt form of the compound, for example the hydrochloride salt, can be dissolved and administered in a pharmaceutical diluent such as Water-for-Injection, physiological saline or 5% glucose. A suitable insoluble form of the compound may be prepared and administered as a suspension in an aqueous base or a pharmaceutically acceptable oil base, e.g. an ester of a long chain fatty acid such as ethyl oleate.

For oral use, solid formulations such as tablets and capsules are particularly useful. Sustained release or enterically coated preparations may also be devised. For pediatric and geriatric applications, suspensions, syrups and chewable tablets are especially suitable.

Alternatively, the unit dosage form of the antibiotic can be a solution of the compound or preferably a salt thereof in a suitable diluent in sterile, hermetically sealed ampoules. The concentration of the antibiotic in the unit dosage may vary, e.g. from about 1 percent to about 50 percent, depending on the compound used and its solubility and the dose desired by the physician.

In a further aspect, this invention provides a method for treating infectious diseases, especially those caused by Gram-positive bacteria and Gram-negative cocci such as Haemophilus influenzae, in animals. The term "treating" is used to denote both the prevention of infectious diseases and the control of such diseases after the host animal has become infected. The method comprises administering to the animal an effective dose of a compound of this invention. An effective dose is generally between about 0.1 and about 100 mg/kg of the compound or its pharmaceutically acceptable salt. A preferred dose is from about 1 to about 30 mg/kg of compound. A typical daily dose for an adult human is from about 100 mg to about 1.0 g.

In practicing this method, the antibiotic compound can be administered as a single daily dose or in multiple doses per day. The treatment regime may require administration over extended periods of time, e.g., for several days or for from two to four weeks. The amount per administered dose or the total amount administered will depend on such factors as the nature and severity of the infection, the age and general health of the patient, the tolerance of the patient to the antibiotic and the microorganism or microorganisms involved in the infection.

A convenient method of practicing the treatment method is to administer the antibiotic orally, using tablets, capsules, suspensions, syrups and the like. The antibiotic may also be administered by other methods, e.g. as a suppository or parenterally via IV infusion.

The following examples are provided in order to illustrate this invention. Unless otherwise indicated, reactions were monitored by thin-layer chromatography (TLC) onn silica gel (E. Merck plates), using a $CH_2Cl_2/MeOH/NH_4OH$ solvent system in a ratio such as 90:10:2, 90:10:1 or 90:10:0.5 and detecting with $I_2$ or anisaldehyde. Comparable systems, such as replacing $CH_2Cl_2$ with $CHCl_3$ or MeOH with EtOH, may also be used. Erythromycylamine was prepared by the method of Wildsmith (Tetrahedron Letters 1972, 29), and N- alkyl-erythromycylamines were prepared by the method of Wildsmith, et al. [*J. Med. Chem.* 16 1059 (1973)].

EXAMPLE 1

9-Deoxo-9-[isopropylamino]-9,11-(N,O)-cyclic Methylene Adduct of Erythromycin (Compound 58)

N-isopropylerythromycylamine (2.7 g, 3.5 mmoles) was dissolved with warming in $CH_3CN$ (25 mL). Aqueous (37%) formaldehyde (1.8 mL) was added, and the mixture was stirred for 2 hours. TLC showed conversion was complete. The solvent was evaporated under reduced pressure, and the residue was dissolved in $Et_2O$. This solution was washed with saturated NaCl solution, dried ($Na_2SO_4$), filtered and evaporated to give 2.3 g of the title compound as a white foam (83% yield). Field desorption mass spectrometry (FDMS): m/z 788 (M+H).

EXAMPLE 2

9-Deoxo-9-[(benzyl)amino]-9,11-(N,O)-cyclic Methylene Adduct of Erythromycin (Compound 62)

N-Benzyl-erythromycylamine (1.0 g, 1.2 mmoles) was dissolved with stirring in $CH_3CN$ (10 mL). Aqueous (37%) formaldehyde (0.4 mL) was added, and the mixture was stirred at room temperature for 4.25 hours. The white solid that formed was collected, washed with $CH_3CN$, and dried overnight under vacuum to give 220 mg of the title compound as a white solid (22% yield); FDMS: m/z 836 (M+H).

EXAMPLE 3

9-Deoxo-9-(cyclopentylamino)-9,11(N,O)-cyclic Methylene Adduct of Erythromycin (Compound 60)

N-Cyclopentylerythromycylamine (1.3 g, 1.6 mmoles) was dissolved in EtOH (10 mL). Aqueous (37%) formaldehyde (0.5 mL) was added, and the mixture was stirred at room temperature. TLC showed incomplete conversion after 24 and 48 hours, so additional formaldehyde (0.5 mL) was added at each time. TLC after 3 days showed complete conversion. The solvent was evaporated, and the resulting solid was dissolved in $Et_2O$ and washed with water. The organic layer was dried over $Na_2SO_4$, filtered and evaporated to give 1.1 g of the title compound (85% yield) as a white foam; FDMS: m/z 814 (M+H).

EXAMPLE 4

9-Deoxo-9-[(5-dimethylamino-2-pentyl)amino]-9,11-(N,O)-cyclic-Methylene Adduct of Erythromycin (Compound 63)

N-[5-(Dimethylamino)-2-pentyl]-erythromycylamine (1.0 g, 1.1 mmoles) was dissolved in $CH_3CN$ (5 mL). Aqueous (37%) formaldehyde (0.5 mL) was added, and the mixture was stirred at room temperature for 3 days. The solvent was evaporated under reduced pressure. The resulting residue was taken up in $CH_2Cl_2$, washed with saturated $NaHCO_3$ solution, dried ($Na_2SO_4$), filtered and evaporated to give a white foam. This foam was further purified by "Chromatatron" chromatography (EtOAc load; step-gradient elution with MeOH/EtOAc in the ratios: 1:9, 17:83 and 1:4) to give 50 mg of the title compound as a white foam (5% yield); FDMS: m/z 887 (M+H).

EXAMPLE 5

9-Deoxo-9-[(N-methyl-N-isopropyl)amino]erythromycin (Compound 70)

Compound 58 (600 mg, 0.76 mmoles) was taken up in 4 mL each of $CH_3CN$ and pH 5.5, 0.1M potassium phosphate buffer. The pH of the solution was adjusted to 6.0 by addition of 1N HCl. Sodium cyanoborohydride (48 mg, 0.76 mmoles) was added, and the mixture was stirred at room temperature. TLC after 22 hr showed incomplete conversion so more sodium cyanoborohydride (24 mg, 0.38 mmoles) was added and stirring was continued for 18 hours.

At this time 1N NaOH was added until precipitation was complete. The acetonitrile was evaporated, and the residue was partitioned between $CH_2Cl_2$ and saturated sodium bicarbonate solution. The organic layer was dried ($Na_2SO_4$), filtered and evaporated to give 500 mg of crude product.

The crude product was further purified by flash chromatography (silica gel; step-gradient elution with $CH_2Cl_2$ and $CH_2Cl_2$/MeOH in 9:1 and 4:1 ratios) to give 100 mg of the title product (17% yield); FDMS: m/z 790 (M+H).

EXAMPLE 6

9-Deoxo-9-[(N-cyclohexyl-N-methyl)amino]erythromycin (Compound 71)

The procedure described in Example 5 was used with these exceptions: 1) the starting material was Compound 61 (2.3 g, 2.8 mmoles); 2) 12 mL each of $CH_3CN$ and buffer and 265 mg (4.2 mmoles) of sodium cyanoborohydride were used; and 3) the reaction was carried out for 1.5 hours at pH 5. The solvent was evaporated, and the residue was partitioned between water and $CH_2Cl_2$. The aqueous layer was saturated with sodium bicarbonate. The organic layer was separated, dried ($Na_2SO_4$), and evaporated to give 2.1 g (90% yield) of the title compound as a white foam; FDMS: m/z 830 (M+H).

EXAMPLE 7

9-Deoxo-9-(1-piperidinyl)erythromycin (Compound 72)

Erythromycylamine (10.0 g, 13.6 mmoles) was dissolved in $CH_3CN$ (50 mL) and pH 6.5, 0.1M sodium phosphate buffer (50 mL) with warming. The pH of this solution was adjusted to 6.0 by careful addition of 6N HCl. Glutaraldehyde (4.2 mL, 20.4 mmoles) was added, and the mixture was stirred at room temperature for 3 hours. Sodium cyanoborohydride (1.3 g, 20.4 mmoles) was added in four portions, and the mixture was stirred for 1 hour.

The reaction product was worked up as in Example 6 to give a yellow foam. This foam was partitioned between diethyl ether and saturated $NaHCO_3$ solution. The organic layer was dried ($Na_2SO_4$), filtered and evaporated to give 6.3 g of crude product as a white foam.

A portion of this material (1.0 g) was further purified by reverse phase preparative high performance liquid chromatography (HPLC), using a Waters "Prep 500" unit and a gradient solvent system of 0.5% triethylamine (TEA) in $H_2O$ to $CH_3CN$:0.5% TEA in $H_2O$ (3:7), to give 300 mg of the title compound as a white foam; FDMS: m/z 802 (M+H).

EXAMPLES 8–9

9-Deoxo-9-(methylamino)erythromycin (Compound 1) and 9-Deoxo-9-(dimethylamino)erythromycin (Compound 69)

The procedure described in Example 6 was used with erythromycylamine (5.0 g, 6.8 mmoles), aqueous (37%) formaldehyde (6.8 mmoles) and sodium cyanoborohydride (640 mg, 10.2 mmoles) in $CH_3CN$ (20 mL) and pH 4.5, 0.5M sodium phosphate buffer (20 mL) at pH 5.0 for 30 minutes.

The material obtained was purified via column chromatography [silica gel; step gradient elution with $CH_2Cl_2$ and $MeOH/CH_2Cl_2$ (1:24 and 2:23)] to give 1.97 g of material containing both products.

The two products were separated from one another by reverse phase HPLC, using a Waters Prep 500 unit and eluting with a gradient of aqueous TEA-phosphoric acid buffer at pH 3.0 to $CH_3CN$/aqueous TEA-phosphoric acid buffer at pH 3.0 (1:3) to give 290 mg of Compound 1 [FDMS: m/z 749 (M+H)] and 280 mg of Compound 61 [FDMS: m/z 763 (M+H)].

GENERAL PROCEDURE A

Erythromycylamine (5.0 g, 6.8 mmol) was dissolved in acetonitrile (20 mL) with warming. This solution was removed from the heat and magnetically stirred while 10.2 mmol of the desired aldehyde was added. A pH 4.5, 0.5M, $NaH_2PO_4$ buffer solution (20 mL) was added. The pH of this solution, which was ~7.5, was then adjusted to 5.0 with 6N HCl, and $NaBH_3CN$ (0.64 g, 10.2 mmol) was added. The pH was re-adjusted from ~6 to 5.0 with 6N HCl. The reaction mixture was allowed to stir at room temperature, and reaction progress was followed by TLC.

When the reaction appeared to be complete, the reaction mixture was evaporated to remove $CH_3CN$. The aqueous residue (~15 mL) contained a gummy solid. Saturated sodium bicarbonate solution (~150 mL) was added, and the product was extracted from the aqueous phase with $CH_2Cl_2$ (~250 mL). The organic phase was dried ($Na_2SO_4$), filtered, and evaporated to give a white amorphous solid.

GENERAL PROCEDURE B

General Procedure A was followed except that 0.86 grams (13.6 mmol) of sodium cyanoborohydride was used.

GENERAL PROCEDURE C

Reaction Procedure B was followed, but the pH was not re-adjusted to 5 after adding sodium cyanoborohydride.

GENERAL PROCEDURE D

Erythromycylamine was dissolved with warming in $CH_3CN$ (4 mL per gram of erythromycylamine), and the appropriate aldehyde (1.5 equivalents) was added. Sodium phosphate buffer (0.5M, pH 4.5; 4 mL/g of erythromycylamine) was added, and the pH was adjusted to 5.0 by careful addition of 6N HCl. Sodium cyanoborohydride (1.5 mol equiv.) was then added.

The mixture was stirred at room temperature, and the reaction was followed by TLC. When TLC indicated that the reaction was complete, most of the $CH_3CN$ was evaporated under reduced pressure. The resulting aqueous residue was made basic by adding 1.0N NaOH or by saturating with sodium bicarbonate. This material was extracted with $CH_2Cl_2$, and the organic layer was separated, dried over $Na_2SO_4$, filtered and evaporated to give the crude product as a white amorphous solid.

EXAMPLE 10

9-Deoxo-9-(n-pentylamino)erythromycin (Compound 5)

Reaction Procedure: A
Reaction Time: 2 hours
Aldehyde: pentanal
Isolation Procedure: Product was crystallized from $CH_3CN$.
Yield: 1.142 g (21%)
mp: 163°; FDMS: m/z 804 (M+H).

EXAMPLE 11

9-Deoxo-9-(n-hexylamino)erythromycin (Compound 6)

Reaction Procedure: B
Reaction Time: 45 minutes
Aldehyde: hexanal
Isolation Procedure: Product was isolated by Waters Prep 500 chromatography (silica gel), using an 8-L gradient of hexane to ethyl acetate containing 1% TEA with an additional 4 L of EtOAc containing 1% TEA. The product was crystallized from $CHCl_3$/hexane.
Yield: 1.328 g (24%)
mp: 98°; FDMS: m/z 819 (M+H).

EXAMPLE 12

9-Deoxo-9-(n-heptylamino)erythromycin (Compound 7)

Reaction Procedure: A
Reaction Time: 2 hours
Aldehyde: heptanal
Isolation Procedure: Basic alumina flash column chromatography (activity grade 3), eluting stepwise with $CH_2Cl_2$ (1 L), $CH_2Cl_2/CHCl_3$ (1:1, 1 L) and $CHCl_3$ (2 L). Product crystallized from $CH_3CN$.
Yield: 0.776 g (14%).
mp: 101°; FDMS: m/z 833 (M+H).

EXAMPLE 13

9-Deoxo-9-(n-octylamino)erythromycin (Compound 8)

Reaction Procedure: C
Reaction Time: 1.5 hour
Aldehyde: octanal
Isolation Procedure: Waters Prep 500 chromatography (silica gel), using an 8-L gradient of $CH_2Cl_2$ to $MeOH/CH_2Cl_2/NH_4OH$ (7.5:90.5:2), and then basic alumina flash chromatography (activity grade 3), eluting with $CHCl_3$ (2 L) to give a white amorphous solid (foam).
Yield: 0.634 g (11%).
FDMS: m/z 847 (M+H).

EXAMPLE 14

9-Deoxo-9-(n-decylamino)erythromycin (Compound 9)

Reaction Procedure: B
Reaction Time: 1 hour
Aldehyde: decanal
Isolation Procedure: Alumina flash chromatography as in Example 13, followed by silica-gel flash chromatography (silica 60, finer than 230 mesh), eluting with $CHCl_3$ (250 mL), a 1.5-L gradient of $CHCl_3$ to MeOH/CHCl₃/NH₄OH (8:91.5:0.5), plus an additional liter of the latter solvent to give a white amorphous solid (foam).
Yield: 1.281 g (22%)
FDMS: m/z 875 (M+H).

EXAMPLE 15

9-Deoxo-9-(n-dodecylamino)erythromycin (Compound 10)

Reaction Procedure: B
Reaction Time: 1.5 hour
Aldehyde: dodecanal
Isolation Procedure: Alumina chromatography as in Example 12 and then silica flash chromatography (silica 60, 230–400 mesh), eluting with CHCl₃ (250 mL), a 1.5-L gradient of CHCl₃ to MeOH/CHCl₃/NH₄OH (6:93.5:0.5), and an additional liter of the latter solvent to give a white foam.
Yield: 2.054 g (34%)
FDMS: m/z 903 (M+H).

EXAMPLE 16

9-Deoxo-9-[(3-methylbutyl)amino]erythromycin (Compound 11)

Reaction Procedure: B
Reaction Time: 1.5 hour
Aldehyde: isovaleraldehyde
Isolation Procedure: Silica flash chromatography (silica 60, finer than 230 mesh), eluting with CHCl₃ (250 mL), a 1.5-L gradient of CHCl₃ to MeOH/CHCl₃/NH₄OH (6:93.5:0.5), and an additional 2 L of the latter solvent; then, basic alumina chromatography (activity grade 3), eluting with CHCl₃ (2 L) to give a white foam.
Yield: 2.073 g (38%).
FDMS: m/z 805 (M+H).

EXAMPLE 17

9-Deoxo-9-[(2-ethylbutyl)amino]erythromycin (Compound 12)

Reaction Procedure: B
Reaction Time: 1.25 hour
Aldehyde: 2-ethylbutyraldehyde
Isolation Procedure: The reaction product was broken into a fine powder in the presence of hexane and was then filtered. The solid material was dissolved in CH₂Cl₂ and placed on a basic alumina flash column (activity grade 3), which was eluted with CH₂Cl₂ (1 L) and CHCl₃ (2 L). The product crystallized from CHCl₃/hexane.
Yield: 2.798 g (50%).
mp: 190°; FDMS: m/z 819 (M+H).

EXAMPLE 18

9-Deoxo-9-[(trans-dec-4-enyl)amino]erythromycin (Compound 14)

Reaction Procedure: A
Reaction Time: 2 hours
Aldehyde: trans-dec-4-enal
Isolation Procedure: Basic alumina flash chromatography (activity grade 3), eluting stepwise with CH₂Cl₂ (1 L), CH₂Cl₂:CHCl₃ (1 L each of 1:1 and 1:3) and CHCl₃ (1 L) to give a white foam. This material was crystallized from CH₃CN and further purified by silica flash chromatography (silica 60, finer than 230 mesh), eluting with CHCl₃ (250 mL), a gradient of CHCl₃ (1.5 L) to MeOH/CHCl₃/NH₄OH (10:89.5:0.5), and an additional liter of the latter solvent to give the title compound as a white foam.
Yield: 1.113 g (19%).
FDMS: m/z 873 (M+H).

EXAMPLE 19

9-Deoxo-9-[cis-dec-4-enyl)amino]erythromycin (Compound 13)

Reaction Procedure: A
Reaction Time: 2 hours
Aldehyde: cis-dec-4-enal
Isolation Procedure: Basic alumina flash chromatography as in Example 18, followed by silica flash chromatography as in Example 18 to give a white foam.
Yield: 1.373 g (23%)
FDMS: m/z 873 (M+H).

EXAMPLE 20

9-Deoxo-9-[(undec-10-enyl)amino]erythromycin (Compound 28)

Reaction Procedure: A
Reaction Time: 1.5 hour
Aldehyde: undec-10-enal
Isolation Procedure: Basic alumina flash chromatography as in Example 18, eluting with CH₂Cl₂ (1 L), a 2-L gradient of CH₂Cl₂ to CHCl₃, plus an additional 1 L of CHCl₃, followed by silica flash chromatography as in Example 18 to give the final product.
Yield: 1.606 g (27%)
FDMS: m/z 886 (M+H).

EXAMPLE 21

9-Deoxo-9-[(3-cyanopropyl)amino]erythromycin (Compound 29)

Reaction Procedure: A
Reaction Time: 2.5 hours
Aldehyde: 3-cyanopropanal
Isolation Procedure: Basic alumina flash chromatography as in Example 20, but eluting with CH₂Cl₂ (250 mL), a 2-L gradient of CH₂Cl₂ to CHCl₃, plus an additional 1.5 L of CHCl₃. The product was crystallized from CH₃CN.
Yield: 1.007 g (19%)
mp: 135°–140°; FDMS: m/z 801 (M+H).

EXAMPLE 22

9-Deoxo-9-[(5-hydroxypentyl)amino]erythromycin Compound 21)

Reaction Procedure: A
Reaction Time: 2 hours
Aldehyde: 5-hydroxypentanal
Isolation Procedure: Basic alumina flash chromatography as in Example 18 with the addition of 2 L of MeOH/CHCl₃ (1:99). The product was further purified by silica flash chromatography as in Example 18 and then was crystallized from CH₃CN.
Yield: 0.800 g (14%)
mp: 145°; FDMS: m/z 821 (M+H).

EXAMPLE 23

9-Deoxo-9-[(3-phenyl-2-propynyl)amino]erythromycin (Compound 18)

Reaction Procedure: A
Reaction Time: 1.75 hour
Aldehyde: phenylpropargyl aldehyde Isolation Procedure: Basic alumina flash chromatography as in Example 18. The product was crystallized from CH$_3$CN and then further purified via silica flash chromatography as in Example 18 to give the title compound.
Yield: 0.809 g (14%).
FDMS: m/z 849 (M+H).

EXAMPLES 24–25

Endo- and Exo-9-Deoxo-9-[(bicyclo[2.2.1]hept-2-en-5-yl-methyl)amino]erythromycin (Compounds 19 and 20)

Reaction Procedure: A
Reaction Time: 1.5 hour
Aldehyde: 5-norbornen-2-carboxaldehyde (endo-, exo- mixture)
Isolation Procedure: Basic alumina flash chromatography as in Example 12. The product was crystallized from CH$_3$CN.
Yield: 1.680 g (29%)
mp: 138°–142°; FDMS: m/z 841 (M+H).

EXAMPLE 26

9-Deoxo-9-[[2-(2,6,6-trimethyl-1-cyclohexen-1-yl)ethyl]amino]erythromycin (Compound 30)

Reaction Procedure: A
Reaction Time: 2.5 hours
Aldehyde: 2,6,6-trimethyl-1-cyclohexen-1-acetaldehyde
Isolation Procedure: Basic alumina flash chromatography as in Example 21 except that elution volumes were CH$_2$Cl$_2$ (250 mL); a 2-L gradient of CH$_2$Cl$_2$ to CHCl$_3$, and an additional 1 L of CHCl$_3$. The product was crystallized from CH$_3$CN.
Yield: 0.946 g (16%)
mp: 172°–175°; FDMS: m/z 885 (M+H).

EXAMPLE 27

9-Deoxo-9-[(cyclooctylmethyl)amino]erythromycin (Compound 16)

Reaction Procedure: A
Reaction Time: 2.5 hours
Aldehyde: cyclooctanecarboxaldehyde
Isolation Procedure: Same as Example 26; crystallized from CH$_3$CN
Yield: 1.385 g (24%)
mp: 200°; FDMS: m/z 858 (M+H).

EXAMPLE 28

9-Deoxo-9-[[[2-(ethoxycarbonyl)cyclopropyl]methyl]amino]erythromycin (Compound 27)

Reaction Procedure: A
Reaction Time: 3.5 hours
Aldehyde: ethyl 2-formyl-1-cyclopropanecarboxylate
Isolation Procedure: Basic alumina flash chromatography as in Example 26; then silica-gel flash chromatography as in Example 18.
Yield: 1.726 g (30%)
FDMS: m/z 860 (M+H).

EXAMPLE 29

9-Deoxo-9-(aziridin-1-yl)erythromycin (Compound 73)
Reaction Procedure: A
Reaction Time: 1.5 hour
Aldehyde: 2-chloroacetaldehyde (50% in H$_2$O)
Isolation Procedure: Basic alumina flash chromatography as in Example 26.
Yield: 1.781 g (34%).
FDMS: m/z 760 (M+H).

EXAMPLE 30

(9S)-9-Deoxo-9-(ethylamino)erythromycin (Compound 2)

Reaction Procedure: D [5.0 g (6.8 mmoles) of erythromycylamine and 0.45 g (10.2 mmoles) of acetaldehyde]
Reaction Time: 19 hours
Isolation Procedure: Initial workup gave 5.1 g of crude product as a white foam. This crude product was purified by flash chromatography [silica gel; CH$_2$Cl$_2$:MeOH (9:1→4:1)]
Yield: 360 mg (7%)
FDMS: m/z 762 (M+H).

EXAMPLE 31

9-Deoxo-9-(n-propylamino)erythromycin (Compound 3)

Reaction Procedure: D [10.0 g (13.6 mmoles) of erythromycylamine and 1.2 g (20.4 mmoles) of propionaldehyde]
Reaction Time: 3 hours
Isolation Procedure: Initial workup gave 10.5 g of crude product as a white foam; this product was purified by Waters Prep 500 HPLC [CH$_2$Cl$_2$→MeOH/CH$_2$Cl$_2$/NH$_4$OH (5:94:1)].
Yield: 5.9 g (56%)
FDMS: m/z 776 (M+H).

EXAMPLE 32

9-Deoxo-9-(n-butylamino)erythromycin (Compound 4)

Reaction Procedure: D [7.0 g (9.5 mmoles) of erythromycylamine and 1.0 g (14.3 mmoles) of butyraldehyde]
Reaction Time: 19.5 hours; TLC showed incomplete conversion, so 1.0 g (14.3 mmoles) of butyraldehyde was added, and the mixture was stirred for an additional 5 hours at room temperature.
Isolation Procedure: Initial workup gave 8.5 g of crude product as a white foam, which was purified by Waters Prep 500 HPLC as in Example 31.
Yield: 1.3 g (17%)
FDMS: m/z 790 (M+H).

EXAMPLE 33

(9S)-9-Deoxo-9-[(3-phenylpropyl)amino]erythromycin (Compound 17)

Reaction Procedure: D [10.0 g (13.6 mmoles) of erythromycylamine and 2.7 g (20.4 mmoles) of hydrocinnamaldehyde]
Reaction Time: 10 minutes
Isolation Procedure: The reaction mixture had separated into two distinct layers. The organic layer was evaporated and taken up in CH$_2$Cl$_2$. The aqueous layer was saturated with sodium bicarbonate and extracted with the CH$_2$Cl$_2$ containing the original organic layer. The CH$_2$Cl$_2$ was dried (Na$_2$SO$_4$), filtered and evaporated to give 12.4 g of crude product. This material was purified by Waters Prep 500 HPLC, eluting with CH$_2$Cl$_2$→MeOH/CH$_2$Cl$_2$/N-H$_4$OH (7.5:87.5:5).
Yield: 5.0 g (43%) as a white foam.

FDMS: m/z 852 (M+H).

EXAMPLE 34

(9S)-9-Deoxo-9-[(3-methoxypropyl)amino]erythromycin (Compound 23)

Reaction Procedure: D [10.0 g (13.6 mmoles) of erythromycin and 1.8 g (20.4 mmoles) of 3-methoxypropionaldehyde]
Reaction Time: 1 hour
Isolation Procedure: Initial workup gave 9.1 g of crude product which was purified by Waters Prep 500 HPLC [CH$_2$Cl$_2$→MeOH/CH$_2$Cl$_2$/NH$_4$OH (7.5:90.5:2)].
Yield: 2.4 g (22%)
FDMS: m/z 806 (M+H).

EXAMPLE 35

9-Deoxo-9-[(1-cyclohex-4-enylmethyl)amino]erythromycin (Compound 15)

Reaction Procedure: D [10.0 g (13.6 mmoles) of erythromycylamine and 2.2 g (20.4 mmoles) of 1,2,3,6-tetrahydrobenzaldehyde]
Reaction Time: 1 hour
Isolation Procedure: Initial workup gave 12.6 g of crude product as a white foam which was purified by Waters Prep 500 HPLC [CH$_2$Cl$_2$→MeOH/CH$_2$Cl$_2$ (5:95)].
Yield: 1.6 g (14%)
FDMS: m/z 829 (M+H).

EXAMPLE 36

9-Deoxo-9-[[3-(methylthio)propyl]amino]erythromycin (Compound 26)

Reaction Procedure: D [10.0 g (10.6 mmoles) of erythromycylamine and 2.1 g (20.4 mmoles) of 3-(methylthio)propionaldehyde]
Reaction Time: 5 hours
Isolation Procedure: Initial workup gave 12.2 g of crude product as a white foam; this was purified by Waters Prep 500 HPLC [CH$_2$Cl$_2$→MeOH/CH$_2$Cl$_2$ (1:9)].
Yield: 1.5 g (13%)
FDMS: m/z 823 (M+H).

EXAMPLE 37

9-Deoxo-9-[(3-hydroxy-2,2-dimethylpropyl)amino]erythromycin (Compound 22)

Reaction Procedure: D [5.0 g (6.8 mmoles) of erythromycylamine and 1.0 g (10.2 mmoles) of 3-hydroxy-2,2-dimethylpropionaldehyde]
Reaction Time: 5 hours [after 3 hours, additional sodium cyanoborohydride (10.2 mmoles) was added; 1 hour later, additional aldehyde (10.2 mmoles) was added; TLC after 5 hours showed no further conversion than had occurred at 1 hour].
Isolation Procedure: Initial workup gave a white foam which crystallized from acetonitrile.
Yield: 864 mg (16%)
FDMS: m/z 821 (M+H).

EXAMPLE 38

9-Deoxo-9-[(7-methoxy-3,7-dimethyloctyl)amino]erythromycin (Compound 24)

Reaction Procedure: D [5.0 g (6.8 mmoles) of erythromycylamine and 1.9 g (10.2 mmoles) of 7-methoxy-3,7-dimethyloctanaldehyde]
Reaction Time: 1 hour
Isolation Procedure: Initial workup gave 6.6 g of crude product which was purified by silica gravity column chromatography [CH$_2$Cl$_2$→MeOH/CH$_2$Cl$_2$ (1:24)]
Yield: 1.0 g (16%)
FDMS: m/z 904 (M+H).

EXAMPLE 39

9-Deoxo-9-[[2-(2-methoxyethoxy)ethyl]amino]erythromycin (Compound 25)

(9S)-9,11-Dideoxy-9,11-[imino[2-(2-methoxyethoxy)ethylidene]oxy]erythromycin (1.0 g, 1.2 mmoles), prepared as described in U.S. Pat. No. 4,048,306, was dissolved in CH$_3$CN (5 mL) and pH 4.5, 0.5M potassium phosphate buffer (5 mL). The pH of the resulting solution was adjusted to 5.0 by adding 6N HCl. Sodium cyanoborohydride (302 mg, 4.8 mmoles) was added, and the mixture was stirred at room temperature for 90 hours.

The reaction mixture was worked up as described in general procedure D to give 1.5 g of crude product. This crude product was purified by silica-gel flash chromatography, eluting stepwise with CH$_2$Cl$_2$, MeOH/CH$_2$Cl$_2$ (1:24) and MeOH/CH$_2$Cl$_2$ (2:23).
Yield: 450 mg (45%)
FDMS: m/z 837 (M+H).

EXAMPLE 40

Preparation of Compound 3 by Hydrogenation

Erythromycylamine (150 g, 0.204 mole) and propionaldehyde (18 g, 0.310 mole) were dissolved in a mixture of tetrahydrofuran (750 mL) and methanol (1200 mL). This solution was hydrogenated over 5% palladium on carbon (150 g) at 120° C. for 16 hr at 500 psi. The solvent was then removed under vacuum to give 133 g of crude product. This material was purified by reverse-phase silica-gel column chromatography (15μ, C8), eluting with aqueous 0.25% acetic acid containing 0 to 5% CH$_3$CN.

EXAMPLE 41

9-Deoxo-9-[(2-Methoxyethyl)amino]erythromycin (Compound 31)

Methoxyacetaldehyde dimethylacetal (0.79 mL, 6.2 mmoles) in 1N hydrochloric acid (6 mL) was stirred for Erythromycylamine (3.0 g, 4.1 mmoles) was dissolved with warming in acetonitrile (12 mL), and sodium phosphate buffer (12 mL, 0.5M, pH 6.5) was added. The acidic methoxyacetaldehyde solution was added dropwise. Hydrochloric acid (6N) was carefully added until the pH of the reaction mixture was 5.0. After the mixture was stirred for 10 minutes at room temperature, sodium cyanoborohydride (390 mg, 6.2 mmoles) was added. One hour after sodium cyanoborohydride addition, the mixture was worked up as in Procedure D to give 2.6 g of a white solid.

Flash chromatography [silica gel; CH$_2$Cl$_2$:CH$_3$OH (24:1) elution] of the solid gave 1.1 g (34% yield) of the title compound. FDMS: m/z 794 (M+H).

Tables VIII-X summarize relevant proton nuclear magnetic resonance (NMR) data for exemplified compounds.

TABLE VIII
Proton NMR of Formula 1 Compounds

| Compound Number | Example Number | C-9-Substituent | 9-H | —NHCH$_2$ | Other H's |
|---|---|---|---|---|---|
| 1 | 8 | —NHMe | 2.05 | — | NHCH$_3$ 2.10 |
| 2 | 30 | —NHEt | 2.21 | 2.75/~2.45 | |
| 3 | 31 | —NH(nPr) | 2.18 | 2.70/2.46 | |
| 4 | 32 | —NHBu | 2.18 | 2.72/~2.45 | |
| 5 | 10 | —NH(CH$_2$)$_4$Me | 2.18 | 2.72/~2.46 | |
| 6 | 11 | —NH(CH$_2$)$_5$Me | 2.18 | 2.72/~2.46 | |
| 7 | 12 | —NH(CH$_2$)$_6$Me | 2.18 | 2.72/~2.46 | |
| 8 | 13 | —NH(CH$_2$)$_7$Me | 2.18 | 2.72/~2.46 | |
| 9 | 14 | —NH(CH$_2$)$_9$Me | 2.18 | 2.72/~2.46 | |
| 10 | 15 | —NH(CH$_2$)$_{11}$Me | 2.18 | 2.72/~2.46 | |
| 11 | 16 | —NH(CH$_2$)$_2$CH(Me)$_2$ | 2.18 | 2.72/~2.46 | |
| 12 | 17 | —NHCH$_2$CH(Et)$_2$ | 2.15 | 2.66/~2.45 | |
| 13 | 19 | —NH(cis-dec-4-enyl) | 2.18 | 2.74/~2.46 | olefinic 5.38 |
| 14 | 18 | —NH(trans-dec-4-enyl) | 2.18 | 2.72/~2.45 | olefinic 5.38 |
| 15 | 35 | —NHCH$_2$(cyclohex-3-enyl) | 2.10 | 2.60/2.45 | olefinic 5.68 |
| 16 | 27 | —NHCH$_2$(cyclooctyl) | 2.16 | ~2.6/~2.45 | |
| 17 | 33 | —NH(CH$_2$)$_3$Ph | 2.18 | 2.78/~2.45 | aromatic 7.24/7.18 |
| 18 | 23 | —NHCH$_2$C≡CPh | ~2.2 | 3.77/3.54 | aromatic 7.3/7.4 |
| 19,20 | 24,25 | —NHCH$_2$(5-norbornen-2-yl) | 2.12 | ~2.8/2.5 | olefinic 6.12/5.94 |
| 21 | 22 | —NH(CH$_2$)$_5$OH | 2.18 | 2.76/~2.46 | |
| 22 | 37 | —NHCH$_2$C(Me)$_2$CH$_2$OH | 2.16 | 2.90 | C(CH$_3$)$_2$ 0.92/0.84 |
| 23 | 34 | —NH(CH$_2$)$_3$OMe | 2.18 | ~2.80/2.52 | OMe 3.34 |
| 24 | 38 | —NH(3,7-diMe-7-MeO-octyl) | ~2.2 | ~2.5 | OMe 3.32 |
| 25 | 39 | —NH(CH$_2$)$_2$O(CH$_2$)$_2$OMe | 2.18 | 2.50 | OMe 3.40 |
| 26 | 36 | —NH(CH$_2$)$_3$SMe | 2.08 | 2.64/~2.5 | SMe 2.10 |
| 27 | 28 | —NHCH$_2$(2-COOEt-cycloprop-1-yl) | ~2.29 | 2.62/~2.46 | $\overset{O}{\underset{\|}{C}}$—O—CH$_2$ 4.12 |
| 28 | 20 | —NH(undec-10-en-1-yl) | 2.19 | 2.72/~2.48 | olefinic 5.82/4.96 |
| 29 | 21 | —NH(CH$_2$)$_3$CN | 2.21 | 2.84/2.62 | |
| 30 | 26 | —NH(CH$_2$)$_2$(2,6,6-triMe-cyclohex-1-en-1-yl) | 2.24 | 2.77/~2.46 | |
| 31 | 41 | —NH(CH$_2$)$_2$OMe | 2.18 | 2.59/2.82 | OMe 3.28 |
| 38 | — | —NH(CH$_2$)$_2$CH$_3$ | — | 2.73/2.48 | |
| 41 | — | —NH(CH$_2$)$_9$CH$_3$ | — | 2.77/~2.5 | |
| 49 | — | —NH(CH$_2$)$_2$O(CH$_2$)$_2$OMe | — | ~2.9/2.68 | 3.44–3.70 (CH$_2$O), 3.40 (CH$_3$) |

TABLE IX
Proton NMR of Formula 2 Compounds

| Compound Number | Example Number | C-9-Substituent | Chemical Shift of N—CH$_2$—O (δ value) |
|---|---|---|---|
| 58 | 1 | —N(CH$_2$—O—11)(iPr) | 4.62 |
| 60 | 3 | —N(CH$_2$—O—11)(cyclopentyl) | 4.64 |
| 62 | 2 | —N(CH$_2$—O—11)(benzyl) | 4.36 |
| 63 | 4 | —N(CH$_2$—O—11)(5-diMeamino-2-pentyl) | 4.59 |

TABLE X
Proton NMR of Formula 3 Compounds

| Compound Number | Example Number | C-9-Substituent | —N—CH$_3$ | N—CH$_2$— |
|---|---|---|---|---|
| 69 | 9 | —N(Me)$_2$ | 2.43 | — |
| 70 | 5 | —N(Me)(iPr) | 2.42 | — |
| 71 | 6 | —N(cyclohexyl)(Me) | 2.40 | — |
| 72 | 7 | —N(CH$_2$)$_5$ | — | 2.80/2.64 |
| 73 | 29 | —N(CH$_2$)$_2$ | — | 1.18/1.73 |

We claim:
1. A compound of the formula

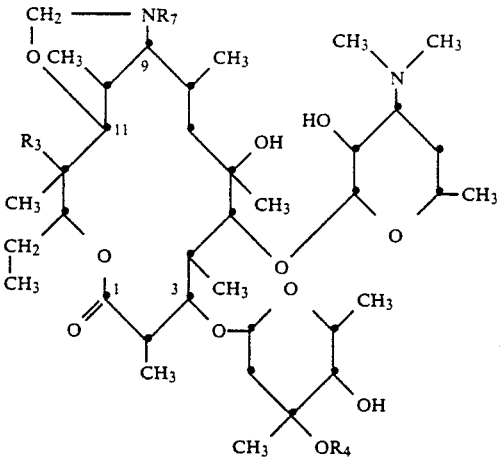

wherein
R$_3$ is hydrogen or hydroxyl;
R$_4$ is hydrogen or methyl;
R$_7$ is CH$_2$R$_5$, C$_3$-C$_8$-cycloalkyl, —CHR$_8$(CH$_2$)$_p$R$_9$, —(CH$_2$)$_q$R$_{10}$ or —CH$_2$(CH=CH)$_r$Ar;
R$_5$ is hydrogen, C$_1$-C$_{14}$-alkyl, —(CH$_2$)$_l$X(CH$_2$)$_m$Y or C$_1$-C$_{14}$-alkyl or —(CH$_2$)$_l$X(CH$_2$)$_m$Y having from one to three substituents selected from the group consisting of halo, hydroxyl, $C_1$-$C_4$-alkyl, $C_1$-$C_4$-alkoxy, $C_1$-$C_4$-alkylthio, cyano, $C_1$-$C_4$-alkoxycarbonyl, mono- or di($C_1$-$C_4$-alkyl)amino and, —N(CH$_2$)$_s$;

$R_6$ is hydrogen, halo, $C_1$-$C_4$-alkyl or $C_1$-$C_4$-alkoxy;

$R_8$ is $C_1$-$C_4$-alkyl, phenyl or benzyl;

$R_9$ is hydrogen, halo, hydroxyl, $C_1$-$C_4$-alkoxy, mono- or di($C_1$-$C_4$-alkyl)amino, —N(CH$_2$)$_s$ or phenyl;

$R_{10}$ is hydroxyl, cyano, $C_1$-$C_4$-alkoxycarbonyl, mono- or di($C_1$-$C_4$-alkyl)amino or —N(CH$_2$)$_s$;

Ar is phenyl; phenyl having one or two halo, $C_1$-$C_{14}$-alkyl, $C_1$-$C_4$-alkoxy or hydroxyl substituents; or an $R_6$-substituted monocyclic aromatic heterocyclic group wherein the monocyclic aromatic heterocyclic group is selected from the group consisting of pyridinyl, pyrimidinyl, pyridazinyl, pyrazinyl, imidazolyl, pyrazolyl, pyrrolyl, furanyl, oxazolyl, thiazolyl and thienyl;

X is oxygen or sulfur;

Y is —X(CH$_2$)$_n$CH$_3$, —N(CH$_2$)$_s$ or —N((CH$_2$)$_n$CH$_3$)$_2$;

l is 1 or 2;

m is an integer from 1 to 3;

n is an integer from 0 to 3;

p is an integer from 1 to 5;

q is 2 or 3;

r is 0 or 1; and s is an integer from 2 to 7;

or a pharmaceutically acceptable salt thereof.

2. A compound of the formula

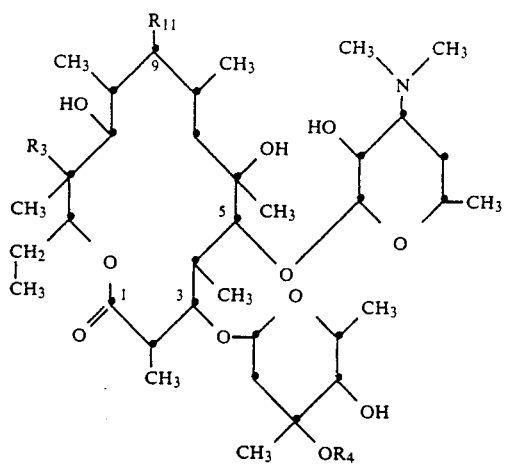

wherein $R_3$ is hydrogen or hydroxyl;

$R_4$ is hydrogen or methyl;

$R_{11}$ is —N(CH$_3$)R$_7$ or —N(CH$_2$)$_s$;

$R_7$ is CH$_2$R$_5$, $C_3$-$C_8$-cycloalkyl, —CHR$_8$(CH$_2$)$_p$R$_9$, —(CH$_2$)$_q$R$_{10}$ or —CH$_2$(CH=CH)$_r$Ar;

$R_5$ is hydrogen, $C_1$-$C_{14}$-alkyl, —(CH$_2$)$_l$X(CH$_2$)$_m$Y or $C_1$-$C_{14}$-alkyl or —(CH$_2$)$_l$X(CH$_2$)$_m$Y having from one to three substituents selected from the group consisting of halo, hydroxyl, $C_1$-$C_4$-alkyl, $C_1$-$C_4$-alkoxy, $C_1$-$C_4$-alkylthio, cyano, $C_1$-$C_4$-alkoxycarbonyl, mono- or di($C_1$-$C_4$-alkyl)amino and, —N(CH$_2$)$_s$;

$R_6$ is hydrogen, halo, $C_1$-$C_4$-alkyl or $C_1$-$C_4$-alkoxy;

$R_8$ is $C_1$-$C_4$-alkyl, phenyl or benzyl;

$R_9$ is hydrogen, halo, hydroxyl, $C_1$-$C_4$-alkoxy, mono- or di($C_1$-$C_4$-alkyl)amino, —N(CH$_2$)$_s$ orphenyl;

$R_{10}$ is hydrogen, cyano, $C_1$-$C_4$-alkoxycarbonyl, mono- or di($C_1$-$C_4$-alkyl)amino or —N(CH$_2$)$_s$;

Ar is phenyl; phenyl having one or two halo, $C_1$-$C_4$-alkyl, $C_1$-$C_4$-alkoxy or hydroxyl substituents; or an $R_6$-substituted monocyclic aromatic heterocyclic group wherein the monocyclic heterocyclic group is selected from the group consisting of pyridinyl, pyrimidinyl, pyridazinyl, pyrazinyl, imidazolyl, pyrazolyl, pyrrolyl, furanyl, oxazolyl, thiazolyl and thienyl;

X is oxygen or sulfur;

Y is —X(CH$_2$)$_n$CH$_3$, —N(CH$_2$)$_s$ or —N((CH$_2$)$_n$CH$_3$)$_2$;

l is 1 or 2;

m is an integer from 1 to 3;

n is an integer from 0 to 3;

p is an integer from 1 to 5;

q is 2 or 3;

r is 0 or 1; and s is an integer from 2 to 7;

or a pharmaceutically acceptable salt thereof.

3. A compound of claim 1 wherein $R_4$ is methyl.

4. A compound of claim 3 wherein $R_3$ is hydrogen.

5. A compound of claim 3 wherein $R_3$ is hydroxyl.

6. A compound of claim 1 wherein $R_4$ is methyl, $R_7$ is CH$_2$R$_5$, and $R_5$ is as defined in claim 1.

7. A compound of claim 3 wherein $R_7$ is $C_3$-$C_4$-cycloalkyl.

8. A compound of claim 1 wherein $R_4$ is methyl, $R_7$ is —CHR$_8$(CH$_2$)$_p$R$_9$, and $R_8$, p and $R_9$ are as defined in claim 1.

9. A compound of claim 1 wherein $R_4$ is methyl, $R_7$ is —(CH$_2$)$_q$R$_{10}$, and q and $R_{10}$ are as defined in claim 1.

10. A compound of claim 1 wherein $R_4$ is methyl, $R_7$ is —CH$_2$(CH=CH)$_r$Ar, and r and Ar are as defined in claim 1.

11. A compound of claim 6 wherein $R_5$ is hydrogen or $C_1$-$C_5$-alkyl.

12. A compound of claim 11 wherein $R_5$ is ethyl.

13. A compound of claim 2 wherein $R_4$ is methyl.

14. A compound of claim 13 wherein $R_3$ is hydrogen.

15. A compound of claim 13 wherein $R_3$ is hydroxyl.

16. A compound of claim 2 wherein $R_4$ is methyl, $R_{11}$ is —N(CH$_3$)R$_7$, and $R_7$ is as defined in claim 2.

17. A compound of claim 2 wherein $R_4$ is methyl, $R_7$ is CH$_2$R$_5$, and $R_5$ is as defined in claim 2.

18. A compound of claim 17 wherein $R_5$ is hydrogen or $C_1$-$C_5$ alkyl.

19. A composition useful for the treatment of susceptible bacterial infections comprising an effective antibacterial amount of a compound of claim 1 together with a suitable vehicle.

20. A composition useful for the treatment of susceptible bacterial infections comprising an effective antibacterial amount of a compound of claim 2 together with a suitable vehicle.

21. A method for treating infections caused by susceptible bacteria which comprises administering an effective amount of a composition of claim 19 to an animal.

22. A method for treating infections caused by susceptible bacteria which comprises administering an effective amount of a composition of claim 20 to an animal.

* * * * *

UNITED STATES PATENT AND TRADEMARK OFFICE
CERTIFICATE OF CORRECTION

PATENT NO. : 5,110,800

DATED : May 5, 1992

INVENTOR(S) : Rosanne Bonjouklian

It is certified that an error appears in the above-identified patent and that said Letters Patent is hereby corrected as shown below:

Column 10, Lines 22-40, Table IV, Column 6 ">0.008" should read -- <0.008 --.

Column 24, Line 50 "was stirred for" should read --was stirred for 4 hrs.--.

Claim 7, Column 28, Line 27 "$C_3-C_4-$" should read --$C_3-C_8-$ --.

Signed and Sealed this

Sixth Day of September, 1994

Attest:

BRUCE LEHMAN

Attesting Officer

Commissioner of Patents and Trademarks